June 28, 1949.  J. S. PELAN  2,474,320
WALL THICKNESS INDICATOR
Filed March 20, 1944  2 Sheets-Sheet 1

INVENTOR.
JOHN S. PELAN
BY
ATTORNEYS

June 28, 1949. J. S. PELAN 2,474,320
WALL THICKNESS INDICATOR
Filed March 20, 1944 2 Sheets-Sheet 2
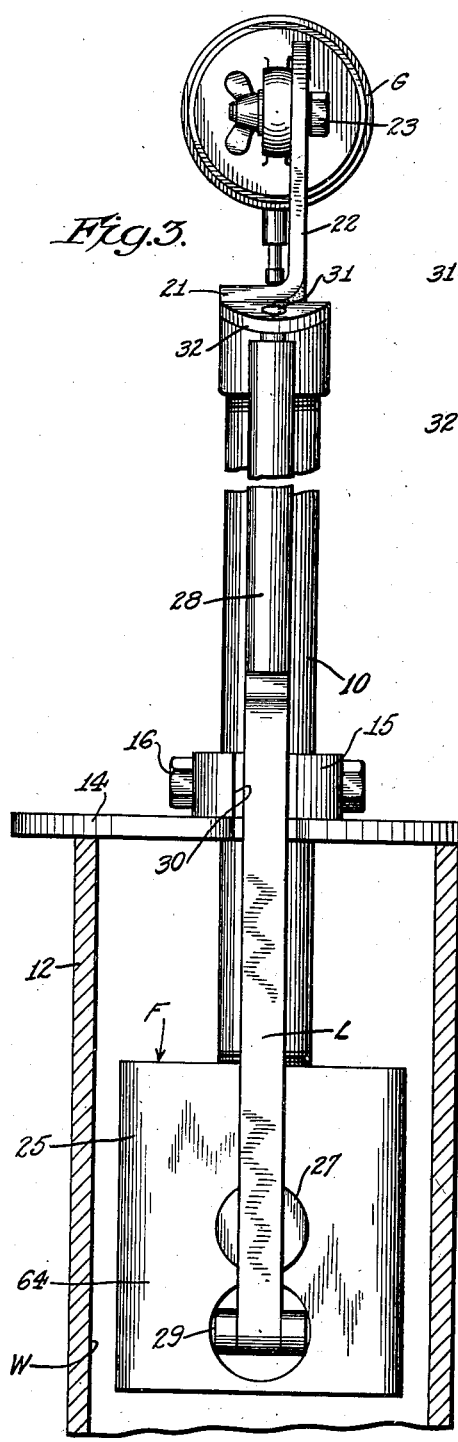
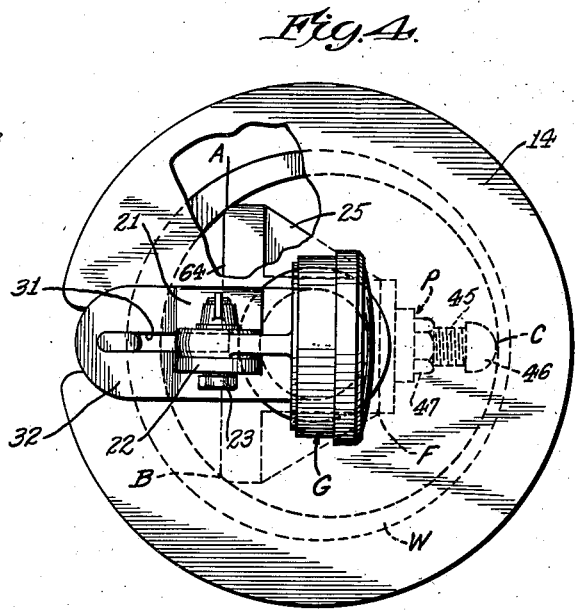
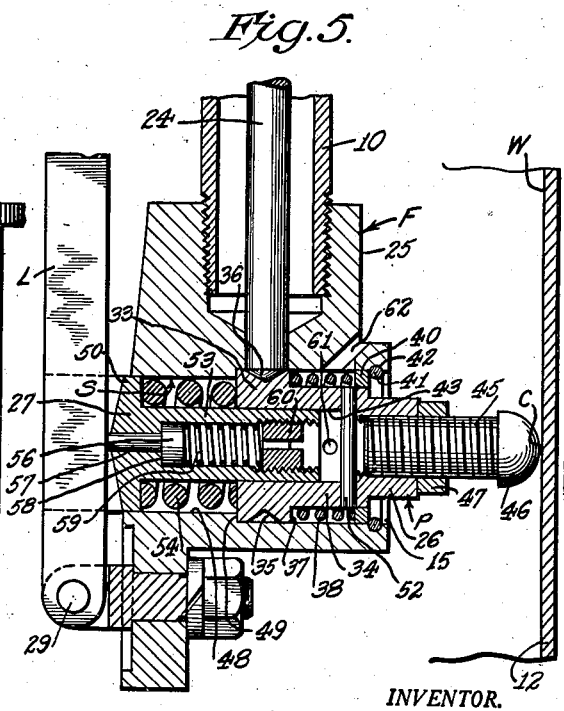
INVENTOR.
JOHN S. PELAN
BY
ATTORNEYS Patented June 28, 1949

2,474,320

UNITED STATES PATENT OFFICE 2,474,320

WALL THICKNESS INDICATOR

John S. Pelan, Plainfield, N. J., assignor to Mack Manufacturing Corporation, New York, N. Y., a corporation of Delaware Application March 20, 1944, Serial No. 527,157

10 Claims. (Cl. 73—119)

This invention relates to wall thickness indicators, and more particularly to tools of this character for detecting thin walls in castings, especially cylinder blocks, for inspection or production purposes.

The wall thickness of castings is subject to wide variations due to shifting of the core. Many times such variations do not become apparent until the engine has been in service for a long time. Uniform cylinder wall thickness is very important, because thin walls result in cylinder bore distortion, especially on the thrust side of the piston, causing undue cylinder wear, piston scuffing and other damage. In engines where the cylinders are bored over-size to take sleeves, a thin wall may result in the bore being slightly out of round, preventing complete contact between the sleeve and wall and thereby causing poor heat transfer. Instances have occurred in which a thin wall broke through when bored for cylinder sleeves.

With the proper use of the tool according to the present invention, these defective cylinders can be detected before leaving the factory, eliminating machining costs, service complaints from this cause, freight or trucking charges, thus effecting a great saving. Without such a tool, in order to inspect a cylinder block for wall thickness, it has been necessary to section the cylinder block, which operation is time-consuming and costly.

While a magnetic gauge has been provided for this purpose, it has been very expensive and limited in scope, requiring recalibration for a change of material of cylinder wall, a separate tool for each size cylinder bore, and being subject to breakage, need of frequent recalibration, and other disadvantages of an electrical instrument. It is, therefore, an important object of the present invention to provide a mechanical tool for indicating wall thickness, which requires no calibration for different materials, can be used for different sizes of cylinder bores in rough castings as well as finished bores, and which is light in weight, readily portable, and requires no electricity.

Other objects and features of novelty will be apparent as the following description proceeds, with reference to the accompanying drawings, in which Figure 1 is a vertical section through a wall thickness indicator according to a preferred embodiment of the present invention, showing the same in position to test a cylinder wall;

Figure 3 is a rear elevation of the same;

Figure 4 is a top plan view of the same; and

Figure 5 is an enlarged detailed vertical section through a portion of the structure shown in Figure 1.

Figure 1:
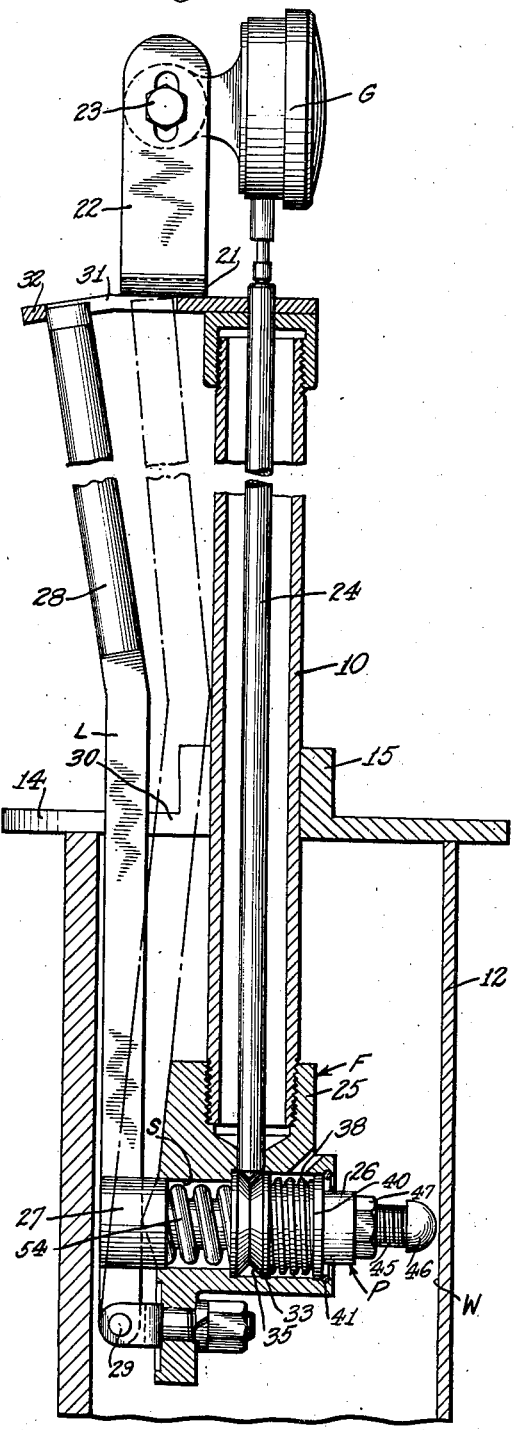

The principle upon which this tool functions is that deflection under the same load is proportional to wall thickness. To utilize this principle, a body member F is provided which is adapted to establish line contact with the cylinder wall W longitudinally thereof, at spaced points A and B shown in Figure 4, and the body member has movably mounted thereon, preferably slidable in a bore therein, a contact carrier P, the contact of which engages the cylinder wall at the point C. A lever L is provided to exert pressure to urge the bearing member and contact carrier apart, thereby forcing the contact carrier into pressure engagement with the cylinder wall W. A gauge G is responsive to relative movement of the carrier P and the bearing member F.

The wall thickness indicator according to the preferred embodiment of the invention shown in the drawings, comprises a barrel 10 which is adapted to be inserted into the cylinder 12, the wall W of which is to be inspected. The barrel carries a stop 14 to limit the extent to which the barrel is inserted into the cylinder. The stop comprises a substantially circular plate of larger diameter than the cylinder and has a central boss 15 adjustably secured to the barrel 10 by set screws 16.

The dial gauge G is mounted on the upper end of the barrel 10, preferably by a bracket 21 having an upstanding arm 22 to which the casing of the gauge G is adjustably secured by a thumb screw 23. An operating stem 24 for the dial gauge G extends down through the barrel 10.

The lower end of the barrel 10 carries the body member F, which in the form shown, comprises a casting 25. This casting has a guide bore S which slidably receives the contact carrier P, and an opposed pressure member 27. The pressure member 27 is slotted and fulcrumed to receive the lever L pivoted at 29 to the lower portion of the body member 25. The lever L extends up through a slot 30 in the stop plate 14, and forms a handle 28 thereabove. The upper end of the handle 28 is received in a slot 31 in a lateral arm 32 of the bracket 21 at the top of the barrel 10.

Figure 2:
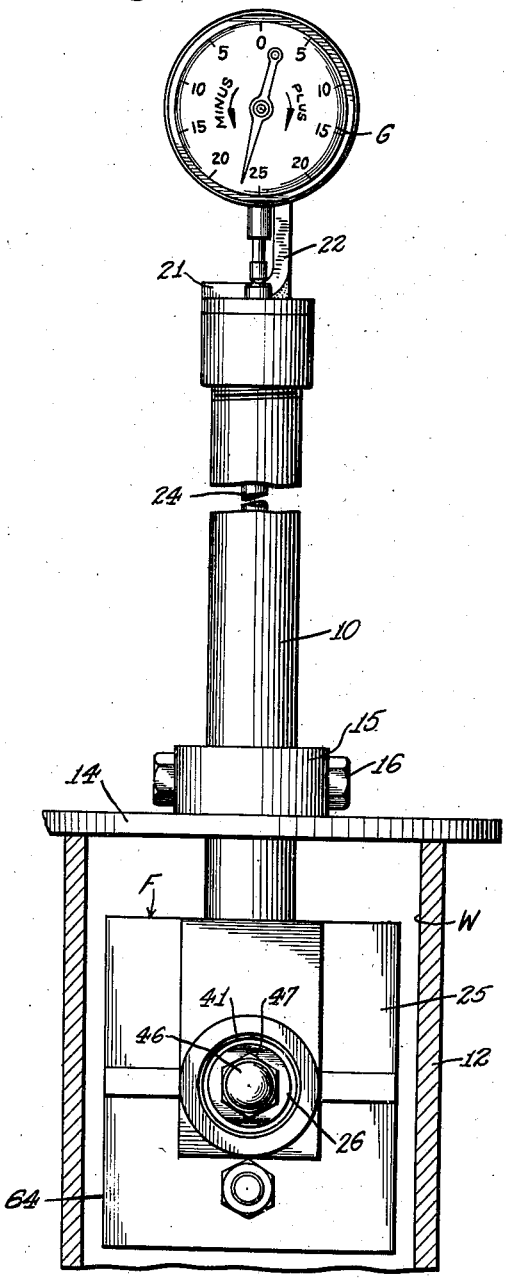
Figure 2 is a front elevation of the structure shown in Figure 1.

The body member 25 comprises a casting substantially triangular in plan as shown in Figure 4. One side of this body member comprises a flat vertical wall 64, substantially rectangular in elevation as shown in Figures 2 and 3.

The contact carrier P is slidably mounted in a transverse bore S in the body member 25. The carrier P is in the form of a piston 26 having a head 33 and a reduced portion 34. The head 33 has a triangular peripheral groove 35, which receives the conical lower end 36 of the operating stem 24 for the dial gauge G.

As shown in Figure 5, the reduced portion 34 of the carrier piston 26 forms a shoulder 37, against which abuts a spring 38 coiled around the reduced portion 34 and bearing against a collar 40 slidably receiving the reduced portion 34, and held in position by a locking ring 41 sprung into a groove 42 in the wall of the bore S.

The carrier piston 26 has a central bore 43, the outer end of which is reduced and tapped to receive a screw 45, the head of which constitutes the contact button 46. A lock nut 47 holds the screw 45 in adjusted position. The carrier P is provided with a stop pin 52 to limit movement of the screw 45 inwardly.

The opposite end of the bore S is of reduced diameter, as at 48, forming a shoulder 49 which constitutes a seat for the head 33 of the carrier piston 26, against which it is urged by the spring 38. Slidably mounted in the reduced guide or bore 48 is the head 50 of the pressure member 27, having a stem 53 of reduced diameter, which slides within the bore 43 of the carrier piston 26. A spring 54 is coiled about the exposed portion of the stem 53. This spring, bearing against the head 33 and the head 50, urges the pressure member 27 outwardly.

The stem 53 of the pressure member 27 is bored to receive the head 56 and stem 57 of a feeler pin, and form a shoulder 58 therebetween against which the head 56 is urged by a spring 59 adjustably secured in the bore by a screw 60 which is suitably drilled for entrance of lubricating oil from the hole 61 in the carrier piston 26, and the hole 62 in the body member 10. These holes serve the additional purpose of preventing the parts from becoming airbound.

In operation, the body member F is inserted into the cylinder bore, until the stop 14 rests on the top of the cylinder. The stop is adjusted to position the button 46 of the contact carrier P about half way down the cylinder bore 12 and locked in this position by the screw 16. The longitudinal edges of the plate portion 64 extend longitudinally of the cylinder bore, and engage the same at the points A and B shown in Figure 4, making line contact with the cylinder wall W.

The contact button 46 is adjusted to clear the cylinder wall W at point C by about a thirty-second of an inch. The lever L is moved toward the barrel 10, this being conveniently done by squeezing the handle 28 and the barrel 10 toward each other. The lever L depresses the stem 57 of the feeler pin and compresses the small spring 59, which bearing on the screw 60, urges the pressure member 27 inwardly. This causes the spring 54 to bear against the head 33 of the contact carrier P and urge it outwardly against the spring 38, thus projecting the contact button 46 into engagement with the cylinder wall W at the point C. At the same time, the groove 35 cams the end of the stem 24 upwardly, thereby registering an indication on the gauge G.

The parts are so proportioned that the end of the stem 57 of the feeler pin projects about one-sixty-fourth of an inch beyond the face of the head 50 of the pressure member 27 when the contact button 46 engages the cylinder wall W. A further movement of the handle 28 of the lever 6 through a distance of about one-eighth of an inch will move the lever into contact with the head 50 of the pressure member 27. During this period, the dial indicator hand of the gauge G is practically stationary. It is during this null period that the first reading is taken.

The lever L is now squeezed or moved inwardly to the limit of its movement, to the position shown in dotted lines in Figure 1, in which the lever engages the barrel 10. This action necessarily deflects the wall W, and if the wall W is thin the deflection will be greater than if the wall W is thick. A thick wall would, of course, offer greater resistance to the contact button, resulting in greater compression of the spring 54, and less movement of the contact carrier P, and consequent less camming action on the stem 24. A second or final reading is taken at this point, and the difference between the two readings is an indication of wall thickness. The gauge G may be calibrated to read directly in terms of wall thickness, if desired.

The device could be operated with the feeler pin 57, spring 59 and screw 60 omitted. When the contact button first engages the cylinder wall W with this arrangement, the lever L engages the fulcrum of the pressure member 27, and starts to compress the spring 54. This condition can be felt by the increased resistance to pressure. The addition of the feeler pin 57 and its associated parts as in the preferred embodiment shown, aids the inspector to accurately determine just when to take the first of the two indicator readings, instead of depending on his sense of increased resistance when the lever L is squeezed, compressing spring 54.

After the two readings are taken, the device is rotated 90° and another set of readings taken, and so on around the circumference of the cylinder bore. If the variation between the differences of the two readings for the four points exceeds the tolerance for the job, the cylinder is rejected.

While the invention has been described with reference to the specific structure disclosed in the accompanying drawings, it is not to be limited save as defined in the appended claims.

I claim:

1. Wall thickness indicator comprising a bearing member adapted to make longitudinal line contact with the bore of a cylinder at spaced points on its inner wall, a contact member slidable on said bearing member and adapted to be projected into engagement with the opposite side of said cylinder bore, means for suspending said members within said cylinder bore, means for applying a predetermined pressure on said contact member when in engagement with said opposite side of the cylinder bore, and means for indicating the extent of projection of said contact member.

2. Wall thickness indicator comprising a bearing member, a contact member and a pressure member movably mounted on said bearing member, means for suspending said members within a cylinder bore, a spring for urging said contact member toward said bearing member, a spring of predetermined resistance for urging said pressure member away from said contact member, a lever pivoted on said bearing member for urging said pressure member toward said contact member against the action of both of said springs to project said contact member into engagement with the wall of said cylinder bore and thereafter to project further said contact member, and means actuated by said contact member for indicating the extent of said further projection thereof.

3. A wall thickness indicator comprising a bearing member adapted to engage one section of a cylinder wall, a contact member movably mounted on said bearing member and adapted to engage another section of said cylinder wall which is to be inspected, means for suspending said members within the bore of said cylinder wall, means for moving said members away from each other with a predetermined pressure against said wall sections and means actuated by said contact member for indicating the amount of deflection of said second section of said wall.

4. A wall thickness indicator comprising a pair of oppositely disposed relatively movable pressure elements adapted to engage oppositely located sections of a cylinder wall to be tested, means for suspending said elements within the bore of said cylinder wall, means for moving said elements away from each other with a predetermined pressure, and means actuated by said elements for indicating the extent of relative movement between said elements.

5. A wall thickness indicator comprising a bearing member adapted to engage one section of a cylinder wall, means for suspending said member within the bore formed by said cylinder wall, said bearing member being provided with a guide, a contact member slidable in said guide and adapted to move away from said bearing member and engage another section of said cylinder wall, means for urging said contact member with a predetermined force into projected position relative to said bearing member and against said other section of said wall, and a gauge for indicating the extent of the projection of said contact member.

6. A wall thickness indicator comprising a bearing member, a contact member movably mounted on said bearing member, means for suspending said members within a cylinder bore, a lever pivoted on said bearing member for moving said contact member relative thereto and for moving said bearing and contact member into engagement with the walls of said cylinder with a predetermined pressure, and means actuated by said contact member for indicating the extent of movement thereof.

7. A wall thickness indicator comprising a bearing member, a contact member movably mounted on said bearing member for movement away from said bearing member, means for suspending said members within a cylinder bore, a spring urging said contact member into retracted position, means for moving said contact member into engagement with the wall of a cylinder bore, resilient means for projecting said contact member with a predetermined force against the opposition of said spring, and means actuated by said contact member for indicating the extent of movement thereof from its engaging position to its projected position.

8. A wall thickness indicator comprising a bearing member having a bore, a contact carrier member slidable in said bore, a contact button on said carrier, a spring urging said carrier into retracted position, a lever pivoted on said bearing member for moving said carrier member to bring said contact button into engagement with a wall and further projecting said carrier member against the action of said spring to impart further movement of said contact button, a spring of predetermined resistance interposed between said lever and said carrier member, and means actuated by said carrier member for indicating the extent of said further movement of said contact button.

9. A wall thickness indicator comprising a bearing member, a contact member movably mounted on said bearing member, means for suspending said members within a cylinder bore, means for moving said contact member relatively to said bearing member to engage said contact member with a wall and thereafter with a predetermined force further to move said contact member, camming means actuated by said contact member and an indicator actuated by said camming means for indicating the extent of said further movement of said contact member.

10. A wall thickness indicator comprising a bearing member adapted to engage one section of a wall, said bearing member having a bore, a contact member adapted to engage another section of a wall to be inspected and a pressure member, said contact member and pressure member being slidable in said bore, a spring between said bearing member and said contact member, a spring between said contact member and said pressure member, said pressure member having a bore, a feeler pin slidable in said pressure member bore, a spring for projecting said feeler pin from said pressure member, a lever pivoted on said bearing member adapted to engage said feeler pin for moving said feeler pin and pressure member to project said contact member out of the bore of said bearing member against the action of said springs, said springs between said bearing member and contact member and between said contact member and pressure member being of predetermined strength and means actuated by said contact member as it is projected from said bearing member for indicating the extent of movement of said contact member.

JOHN S. PELAN.

REFERENCES CITED

The following references are of record in the file of this patent:

UNITED STATES PATENTS

| Number | Name | Date |
|---|---|---|
| 660,445 | Lillicrap | Oct. 23, 1900 |
| 1,329,456 | Carpenter | Feb. 3, 1920 |
| 1,630,110 | Cole | May 24, 1927 |
| 1,775,828 | Patton | Sept. 16, 1930 |
| 1,883,154 | Watrous | Oct. 18, 1932 |

FOREIGN PATENTS

| Number | Country | Date |
|---|---|---|
| 119,001 | Switzerland | Aug. 1, 1927 |
| 578,424 | Germany | June 14, 1933 |